United States Patent [19]

Takeda et al.

[11] 4,069,440

[45] Jan. 17, 1978

[54] RECORDING MATERIAL

[75] Inventors: Takeshi Takeda; Fumio Muramatsu, both of Kawasaki; Akinori Watanabe, Komae, all of Japan

[73] Assignee: Matsushita Electric Industrial Co., Ltd., Osaka, Japan

[21] Appl. No.: 426,124

[22] Filed: Dec. 19, 1973

Related U.S. Application Data

[62] Division of Ser. No. 197,769, Nov. 11, 1971, abandoned.

[30] Foreign Application Priority Data

Nov. 25, 1970 Japan .................................. 45-104235
Feb. 25, 1971 Japan .................................. 46-10050

[51] Int. Cl.$^2$ ........................ H01J 29/12; H01J 29/14
[52] U.S. Cl. ..................................... 313/465; 252/300
[58] Field of Search ............................................. 313/465

[56] References Cited

U.S. PATENT DOCUMENTS 2,752,521  6/1956  Ivey .......................................... 313/465
2,761,846  9/1956  Medved ................................. 252/301.4
3,598,750  8/1971  Phillips ................................... 252/300

FOREIGN PATENT DOCUMENTS 1,187,982  4/1970  United Kingdom ................. 252/300

OTHER PUBLICATIONS

Kirk, "Role of Sulfur in the Luminescence and Coloration of Some Aluminosilicates"; Journal of the Electrochemical Society, Sept. 1954, vol. 101, No. 9, pp. 461–465.

"Investigation of Inorganic Phototropic Materials, etc.", US Department of Commerce Technical Documentary Report ASD–TDR–62–305, 1962, pp. 29–34.

*Primary Examiner*—Robert Segal
*Attorney, Agent, or Firm*—Stevens, Davis, Miller & Mosher

[57] ABSTRACT

Production of a recording material having the chemical composition $Na_6Al_6Si_6O_{24} \cdot 2(1-x)NaX \cdot xNa_2SO_4$ (X is F, Cl, Br or I and $0.1 \leq X \leq 0.8$) by only the simple sintering method can be attained by substituting a part of halogen site of said composition by other ions.

3 Claims, 7 Drawing Figures

RECORDING MATERIAL

This is a division, of application Ser. No. 197,769, filed Nov. 11, 1971 now abandoned.

The present invention relates to a recording material using sodalite which displays cathodochromism and more particularly it relates to a recording material using sodalite having the chemical composition $Na_6Al_6Si_6O_{24} \cdot 2(1-x)NaX \cdot xNa_2SO_4$ wherein X is F, Cl, Br or I and $0.1 \leq X \leq 0.8$.

Recently, dark race tubes using sodalite as screen material have been developed for storage-display application. The screen material in these tubes is colored upon exposure to electron beam and is bleached upon exposure to light or by heating. This phenomenon is called "cathodochromism" from analogy to photochromism. Sodalite is an aluminosilicate represented by an ideal formula $Na_8Al_6Si_6O_{24} \cdot Cl_2$.

As is well known, dark trace tubes using KCl were developed for radar in U.S.A. and England and they were called the scotophor tube and the skiatron, respectively. The recently developed sodalite tubes have more excellent characteristics than the KCl tube in many points. The coloration by exposure to electron beam occurs due to absorption of F-center in both the KCl and sodalite. However, due to color center aggregation, the induced coloration in KCl cannot be completely erased by exposure to light and necessarily requires heating for complete erasure. On the other hand, there is little aggregation of F-center in sodalite, the induced cathodochromic coloration in sodalite can be substantially completely erased only by exposure to light. Furthermore, sodalite has high practical value because it has a higher writing speed and less fatigue than KCl.

The practicality of sodalite as a screen material was already proposed by Ivey in 1956. That is, U.S. Pat. No. 2,752,521 issued to H.F. Ivey on June 26, 1956 is directed to a cathode ray tube which uses a screen material having the structural formula $M'_6Al_6Si_6O_{24} \cdot xMX$ wherein M and M' represent an alkali metal, X is a halogen and $0 \leq X \leq 2$.

Medved synthesized a photochromic sodalite for the first time. In this respect, see O.B. Medved "Optical properties of natural and synthetic Hackmanite" J. Chem. Phys. 21 1309 (1953) and U.S. Pat. No. 2,761,846 issued on Sept. 4, 1956. His method comprises heat treating sodalite synthesized by the sintering method, in a reduction atmosphere such as hydrogen. That is, components are mixed in accordance with the expression $6NaOH + 3Al_2O_3 + 6SiO_2 + 2NaCl$ and the mixture is sintered at 1060° C for 24–72 hours. Thus obtained sodalite was ground and subjected to reduction treatment at 1050° C for 1 hour. The resultant sodalite is colored in magenta with a photoexcitation of 2537 A and displays photochromism. Medved makes no mention of cathodochromism, while the present invention deals with cathodochromic sodalite. According to the report by Medved, sodalite before subjected to reduction treatment was also colored by exposure to X-rays and hence will be colored also by exposure to electron beam. However, it is considered that the coloration was poor. This is because no report as to production of practical cathode ray tube by way of trial has not been made in spite of proposal of Ivey before obtainment of sodalite by the hydrothermal method mentioned below.

In 1966, Williams et al. produced sodalite by the hydrothermal method which exhibits better photochromism than that of sodalite obtained by the sintering method. This was reported in E.F. Williams, W.G. Hodgson and J.S. Brinen "Synthetic photochromic sodalite" J. Amer. Ceram. Soc. 52 139 (1969). The cathodochromic characteristic of said sodalite produced by Williams et al. was studied by Kiss et al. of RCA and practical cathode ray tubes were produced by them by way of trial. This was reported in W. Phillips and Z.J. Kiss "Photo Erasable Dark Trace Cathode Ray Storage Tube" Proc. IEEE. 56 2072 (1968). Thereafter, the cathode ray tube was also produced by way of trial in Royal Radar Establishment. Sodalite synthesized by the hydrothermal method was used as screen material in these cathode ray tube. In this respect, refer to M.J. Taylor, D.J. Marshall, P.A. Forrester and S.D.McLanghlan "Color Centers in Sodalite and Their Use in Storage Displays", The Radio and Electronic Engineer, 40 17 (1970). However, it should be noted that the sodalite as produced by the hydrothermal method shows no response to ultraviolet, electron beam and X-rays and can be both photochromic and cathodochromic only when subjected to a reduction treatment.

In spite of the fact that the sodalite tube has more practical value in many points as compared with the KCl tube, the former cannot be still ideal device and has some problems to be solved. The most serious problem is that sodalite exposed to electron beams of more than the threshold cannot be completely bleached to a colorless state by exposure to light and shows residual coloration which can be erased only by heating. An attempt has been made to overcome said problem in RCA and it has been found that sensitivity of residual coloration in I-sodalite which is obtained by substituting I for Cl in sodalite is lowered by about one figure as compared with Cl-sodalite. This was reported in W. Phillips "Properties of Cathodochromic Sodalite" J. Electrochem. Soc. 117 1557 (1970).

As mentioned above, sodalite which has such characteristics as making it possible to be used in practical cathode ray tube has all been produced by the hydrothermal method and then subjected to a reduction treatment. Therefore, it has been desired to obtain sodalite having a high sensitivity and an excellent light erasable characteristic by a simpler method.

Therefore, it is an object of the present invention to provide sodalite by only the simple sintering method which has the cathodochromic characteristics similar to those of sodalite obtained by hydrothermal method plus reduction treatment and this object is attained by substituting a part of halogen site of sodalite by other ion.

The characteristics of the present invention resides in that part of halogen site of sodalite is substituted by anion or anion groups having a higher valency than halogen and vacancy is introduced into the halogen site.

Firstly, an explanation will be given with reference to an embodiment using $SO_4^{2-}$ as divalent ion group. Sodalite whose halogen site is partially substituted by $SO_4^{2-}$ has the general formula $Na_6Al_6Si_6O_{24} \cdot 2(1-x)NaCl \cdot xNa_2SO_4 (0 \leq X \leq 1)$ and is considered to be a solid solution of sodalite and noselite $Na_8Al_6Si_6O_{24} \cdot SO_4$. The presence of the solid solution of sodalite-noselite was already known, but no report has been made on its cathodochromism.

EXAMPLES

Figure 1:
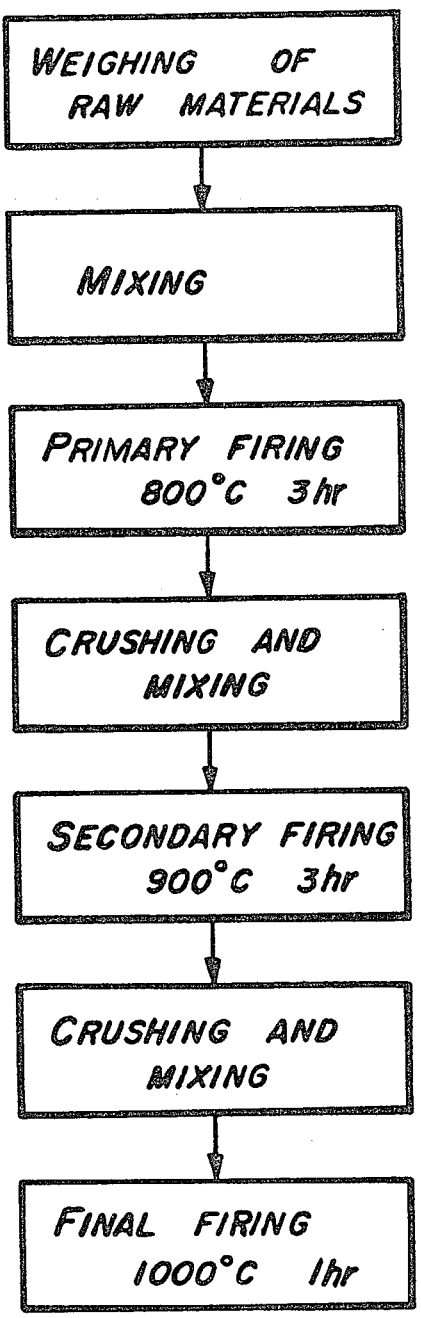
FIG. 1 is a flow sheet showing one embodiment of a process for synthesis of sodalite according to the present invention.
Figure 2:
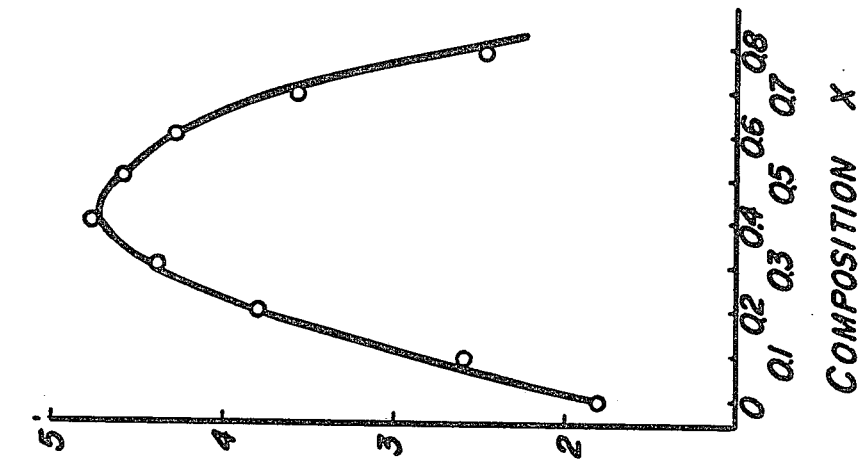
FIG. 2 shows relation between lattice constant and peak wavelength of absorption when x in $Na_6Al_6Si_6O_{24} \cdot 2(1-x)NaCl \cdot xNa_2SO_4$ is varied.

Synthesis of samples was effected in accordance with the process shown in FIG. 1. Firstly, necessary amounts of C.P. grade $Na_2CO_3$ (or NaOH), $Al_2O_3$, $SiO_2$, NaCl and $Na_2SO_4$ are weighed for each composition x and mixed. According to Medved, the mixture is to be sintered at 1060° C for 24–72 hours, but it is supposed that at such a high temperature, evaporation of NaCl considerably occurs. Therefore, in the present invention, the sample mixture was fired in a covered platinum crucible placed in a furnace at gradually elevated temperatures, namely, at 800° C for 3 hours, at 900° C for 3 hours and then at 1,000° C for 1 hour, as shown in FIG. 1. The relation between lattice constant of cubic cell and peak wavelength of absorption at various composition x is shown in FIG. 2. The peak wavelength of absorption is same between exposures to X-rays and electron beam.

Figure 3:
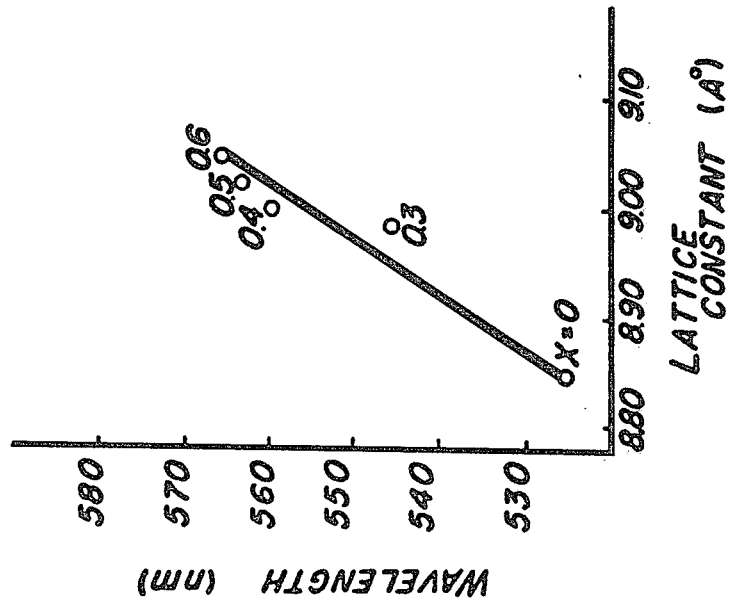
FIG. 3 shows relation between contrast $C_t$ and x in said composition.

Coloration by exposure to electron beam is measured with use of a sample coated in a thickness of 40–50 μm onto an aluminum foil. That is, a reference light beam is irradiated to the surface of said sample coated and the ratio of reflection intensities before and after the irradiation is calculated. That is the coloration is expressed by contrast $C_t = Io/I$, wherein Io and I are intensities of diffusely reflected reference light before and after exposure to electron beam, respectively. FIG. 3 shows thus obtained $C_t$ for various compositions x. Acceleration voltage of electron beam was 15 KV, diameter of beam was about 8 mm and exposure was 100 μQ/cm². As is seen from the Figure, $C_t$ increases with increase of x, reaches maximum at x = 0.4–0.5 and decreases with further increase of x. It should be noted that the samples in the present invention were not subjected to any reduction treatment and were in the sintered state. In this respect, the sodalite according to the present invention is different from the cathodochromic sodalite obtained by the conventional hydrothermal method plus reduction treatment.

Regarding the sodalite obtained by substituting $SO_4^{2-}$ for a part of $Cl^{1-}$ site, the following may be expected. That is, as cathodochromic mechanism, it is considered that electron-hole pairs are formed in conduction band and valence band by exposure to electron beam and electrons are trapped by Cl vacancy to form F center and holes are trapped by some hole traps. It is supposed that said electron trap and/or hole trap are introduced through some process by the usual reduction treatment. In case of adding $SO_4^{2-}$ ion, there is the possibility that vacancy is introduced into Cl site due to charge balance and moreover $SO_4^{2-}$ ion itself may act as hole trap to result in $SO_4^{2-}$ + hole → $SO_4^{1-}$. This possibility can be easily supposed in view of the fact that presence of $SO_4^{1-}$ ion in sodalite was confirmed in ESR [L.V. Bershov. V.O. Martirosyan, A.N. Platonov and A.N. Tarashchan, Neorganish, Mater. 5 1780 (1969)]. That is, it is considered that addition of $SO_4^{2-}$ forms the state where F center is more easily produced. As discussed above, solid solution of sodalite-noselite has higher $C_t$ than sodalite. Therefore, $SO_4^{2-}$ ion has sensitization action on cathodochromism. This is the first effect of $SO_4^{2-}$ ion.

Figure 5:
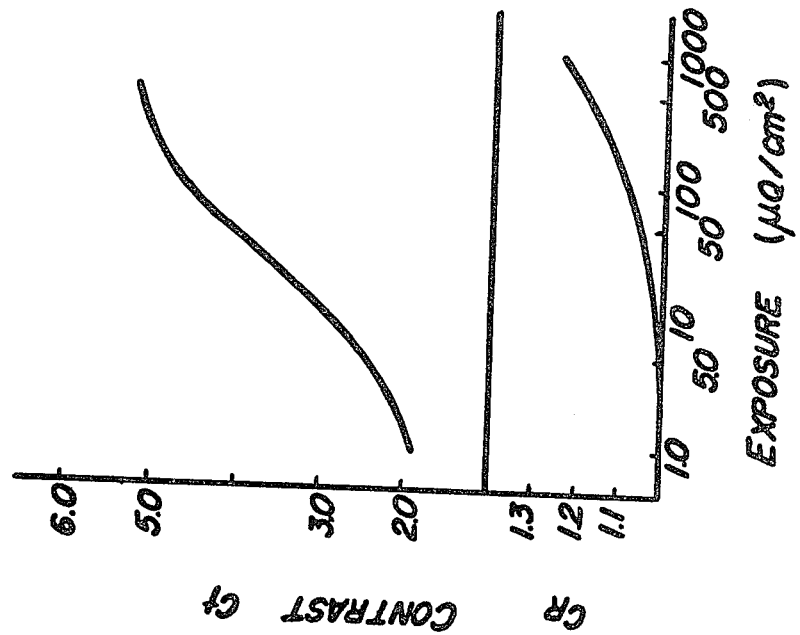
FIG. 5 shows relations between exposure and $C_t$ and $C_R$ in $Na_6Al_6Si_6O_{24} \cdot 1.2NaCl \, 0.4Na_2SO_4$.
Figure 4:
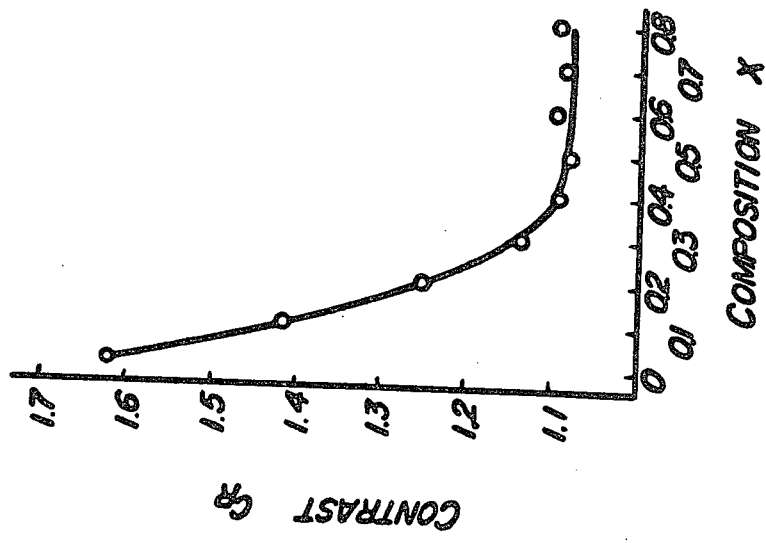
FIG. 4 shows relation between contrast $C_R$ and x in said composition.
Figure 7:
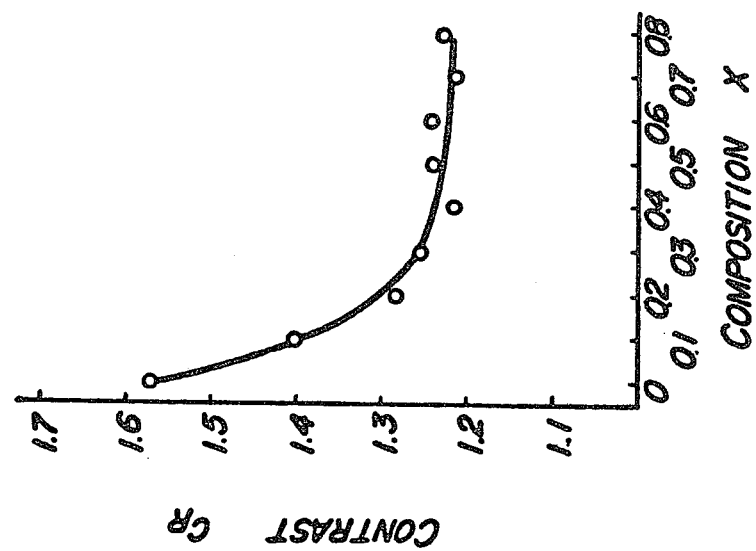
FIG. 7 shows relation between $C_R$ and x in the composition referred to in FIG. 6.
Figure 6:
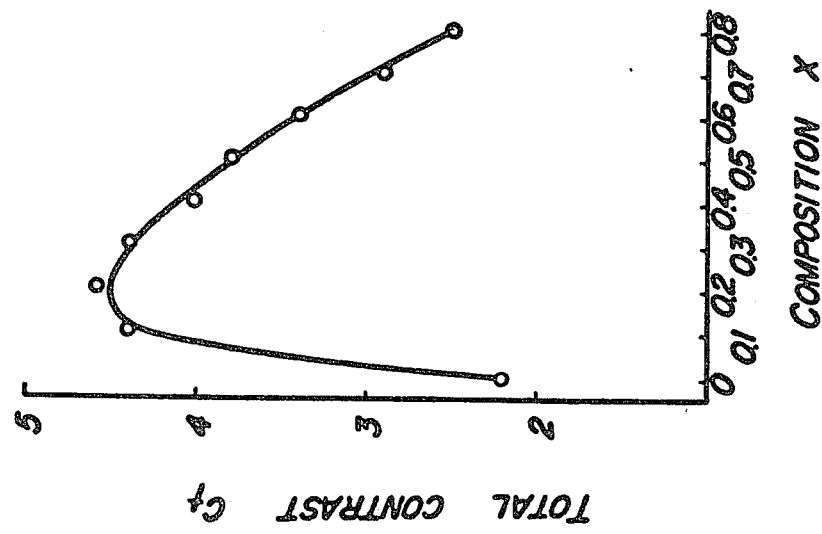
FIG. 6 shows relation between $C_t$ and x in $Na_6Al_6Si_6O_{24} \cdot 2(1-x)NaBr \cdot xNa_2SO_4$.

The second more useful effect of $SO_4^{2-}$ ion is improvement in the light erasable characteristic by addition thereof. FIG. 4 shows the degree of residual coloration when samples colored at an acceleration voltage of 15 KV and an exposure of 100 μQ/cm² were exposed to light from tungsten lamp of 300 W positioned at a distance of 40 cm from the samples for one minute. Contrast $C_R$ of residual coloration decreases with increase of substitution amount x of $SO_4^{2-}$. When x = 0, $C_R = 1.62$ and when x = 0.4, $C_R = 1.09$. When x exceeds 0.4, $C_R$ is nearly constant. FIG. 5 shows changes of $C_t$ and $C_R$ with change of exposure in case of x = 0.4 as a typical example. The result will be compared with the result obtained in sodalite produced by the hydrothermal method plus reduction treatment. The I-sodalite produced by RCA and having the lowest $C_R$ up to the date has $C_t \approx 3.5$ and $C_R \approx 1.1$ when exposed to 100 μQ/cm² of electron beam having an acceleration voltage of 28 KV. This was reported in W. Phillips "Properties of Cathodochromic Sodalite" J. Electrochem. Soc. 117 1557 (1970). The samples according to the present invention had $C_t \approx 4.5$ and $C_R = ]1.09$ when exposed to electron beam having an acceleration voltage of 15 KV at 100 μQ/cm². Here, it should be noted that the methods of measurement are different between RCA and the present invention. That is, in the former, the measurement was carried out with cathode ray tube. The screen of this tube was aluminized and contrast was measured from the front, namely, from the opposite side of the colored surface. Therefore, both $C_t$ and $C_R$ are smaller than those in the present invention. Hence, although exact comparison is impossible, $C_t$ and $C_R$ seem to be substantially the same in RCA and the present invention in consideration of the difference in acceleration voltage. As disclosed in said Ivey patent, it is known that there are various varieties in sodalite. The inventors attempted firstly to substitute Cl in the solid solution of sodalite-noselite by other halogens. FIGS. 6 and 7 show the cathodochromic characteristics in case of substituting Br for Cl. $C_t$ and $C_R$ both were nearly the same as those of (Cl-sodalite)-noselite, but value x at which $C_t$ was maximum was 0.1-0.3. $C_R$ also decreased with increase of x and was constantly about 1.2 when x ≧ 0.3. In case of substituting F or I for Cl, $C_t$ was low and when $0.2 \leq X \leq 0.6$, $C_t \approx 2.2$ which was nearly constant. However, $C_t$ was clearly increased as compared with the case of x = O. $C_R$ also decreased with increase of x.

Next, the inventors attempted to substitute Na by other alkali metals. When Na was totally substituted by Li or K, substantially no coloration was caused and when partially substituted, $C_t$ abruptly decreased when the substitution amount exceeded a certain value. This threshold was ½ of the total alkali metal in case of Li substitution and ¼ of the total alkali metal in case of K substitution. Cs and Rb substitutions will also be possible when in a small amount. Substitution by alkaline earth metal such as Ca, Sr or Ba was attempted in such a manner that two of Na were removed and one alkaline earth metal was added to find that $C_t$ also gradually decreased with increase of substitution amount. For example, $C_t \approx 2.9$ was obtained in $Na_6Al_6Si_6O_{24} \cdot 0.5\text{-}CaCl_2 \cdot 0.5Na_2SO_4$ (substitution of ½·CaCl₂ for NaCl). There being some difference among substitutions by Ca, Sr and Ba, when substitution amount is more than ⅛ of Na site, $C_t$ abruptly decreased.

Substitutions of Ga and Ge for Al and Si, respectively were also attempted to find that substitutution in a small amount was possible, but when substitution amount was, for example, about ½, $C_t$ decreased considerably.

Next, substitutions of divalent ion and trivalent ion other than $SO_4^{2-}$ for halogen were attempted. The attempted ions were $SeO_4^{2-}$, $TeO_4^{2-}$, $WO_4^{2-}$, $MoO_4^{2-}$, $CrO_4^{2-}$, $TiO_4^{2-}$, $SnO_4^{2-}$, $VO_4^{3-}$ and $PO_4^{3-}$. Regarding trivalent ions, for example, in case of $PO_4^{3-}$, $Na_3PO_4 \cdot 12H_2O$ was added in the form of $Na_6Al_6Si_6O_{24} \cdot 2(1-x)NaCl \cdot (\frac{2}{3})xNa_3PO_4$. Among the above enumerated ions, $WO_4^{2-}$ ion resulted in conspicuous effect. Substitution of $WO_4^{2-}$ for $Cl^{1-}$ ion had the same effects as substitution by $SO_4^{2-}$. Furthermore, sodalite in which $SO_4^{2-}$ ion and $WO_4^{2-}$ ion were simultaneously substituted for $Cl^{1-}$ ion, for example, $Na_6Al_6Si_6O_{24} \cdot NaCl \cdot 1/2(1-Z)Na_2SO_4 \cdot Z/2 Na_2WO_4$ had substantially the same cathodechromic characteristic (in $0 \leq Z \leq 1$) as the sodalite in which only $SO_4^{2-}$ ion was substituted for $Cl^{1-}$ ion.

The following attempts were made to clarify the relation between the sodalite of the present invention where divalent ion was substituted for halogen and that subjected to the conventional reduction treatment.

Firstly, $Na_6Al_6Si_6O_{24} \cdot 1.2NaCl \cdot 0.4Na_2SO_4$ (x = 0.4 in $Na_6Al_6Si_6O_{24} \cdot 2(1-x)NaCl \cdot xNa_2SO_4$) was fired at 1000° C by the usual process and then heat treated in hydrogen atmosphere at 800° C for 30 minutes to find that $C_t$ was rather apt to decrease. On the other hand, $Na_6Al_6Si_6O_{24} \cdot 2NaCl$ (x = O) was subjected to the same treatments to find that $C_t$ was enhanced by about 2 times. However, $C_R$ was substantially the same as that before the treatments or increased a little. It can be concluded from said results that the addition of divalent ion group results in the improvements in sensitization action and light erasable characteristic at the state of being subjected to no reduction treatment.

The effects and advantages of the present invention can be summarized as follows:

1. Cathodochromic sodalite which has the similar sensitivity to that obtained by the conventional hydrothermal method plus reduction treatment can be obtained.
2. The improved light erasable characteristic can be attained. The sodalite of the present invention in which Cl site is substituted by $SO_4^{2-}$ or $WO_4^{2-}$ have the similar light erasable characteristic to that of the conventional I-sodalite which has been considered to have the best light erasable characteristic.
3. Cathodochromic sodalite having substantially the same characteristic as the sodalite obtained by the conventional hydrothermal method plus reduction treatment can be obtained by only sintering method. Thus, the process of synthesis has become simple.

What is claimed is:

1. A cathode ray device using a cathodochromic recording material having the chemical composition $M_6Al_6Si_6O_{24} \cdot 2(1-y)MX \cdot yM_2Z$ wherein X is a member selected from the group consisting of F, Cl, Br and I; wherein M is Na or a mixture of Na and at least one element selected from the group consisting of Li and K; wherein Z is selected from the group consisting of $WO_4$ and mixtures of $SO_4$ and $WO_4$ and $0.1 \leq y \leq 0.8$.

2. The cathode ray device according to claim 1 wherein M is Na.

3. The cathode ray device according to claim 1 wherein M is a mixture of Li and Na with the amount of Li being ¼ of the total alkali ion or M is a mixture of K and Na with the amount of K being ⅛ of the total alkali ion.

* * * * *